United States Patent
Tanaka et al.

(10) Patent No.: US 6,548,199 B1
(45) Date of Patent: Apr. 15, 2003

(54) FUEL CELL DEVICE WITH A HEAT RELEASE MEANS DISPOSED ON AN AUTOMOBILE

(75) Inventors: Hirohisa Tanaka, Ikeda (JP); Hiroshi Munetoki, Ikeda (JP)

(73) Assignee: Daihatsu Motor Co., Ltd. (JP)

( * ) Notice: Subject to any disclaimer, the term of this patent is extended or adjusted under 35 U.S.C. 154(b) by 138 days.

(21) Appl. No.: 09/652,789

(22) Filed: Aug. 31, 2000

(30) Foreign Application Priority Data

Sep. 24, 1999 (JP) .......................................... 11-270181

(51) Int. Cl.$^7$ .......................... H01M 8/04; B60K 1/04
(52) U.S. Cl. ..................... 429/26; 180/65.3; 180/68.5
(58) Field of Search ........................... 429/20, 26, 29

(56) References Cited

U.S. PATENT DOCUMENTS

| | | | | |
|---|---|---|---|---|
| 4,500,612 A | * | 2/1985 | Fujii | ........................... 429/26 |
| 5,193,635 A | * | 3/1993 | Mizuno | ..................... 180/65.3 |
| 6,196,620 B1 | * | 3/2001 | Haraway, Jr. | ............. 296/180.5 |

FOREIGN PATENT DOCUMENTS

| | | | | |
|---|---|---|---|---|
| JP | 405260606 | * | 10/1993 | ............. B60L/8/00 |
| JP | 6-188013 | | 7/1994 | |
| JP | 10-340734 | | 12/1998 | |

OTHER PUBLICATIONS

"Fuel Cells: A Handbook," Hirschenhofer, J.H., B/T Books, 1996, chapter 6.*

* cited by examiner

Primary Examiner—Patrick Ryan
Assistant Examiner—Mark Ruthkosky
(74) Attorney, Agent, or Firm—George T. Marcou; Kilpatrick Stockton LLP

(57) ABSTRACT

A fuel cell device that is designed to circulate cooling water with simplified and compact construction, without any need of a pump for circulating the cooling water, so as to reduce electric power loss. A fuel cell and a radiator are connected through a closed line via an inflow-side cooling pipe and an outflow-side cooling pipe and also the radiator is disposed under the wing of an air spoiler spaced above the fuel cell and open to outside air. With this arrangement, while the fuel cell generates electric power, the cooling water of decreased density flowing out of the fuel cell is allowed to rise through the outflow-side cooling pipe to feed it to the radiator and the cooling water of increased density that was cooled down by heat exchanging the cooling water and outside air is allowed to lower through the inflow-side cooling pipe to feed it to the fuel cell again.

3 Claims, 5 Drawing Sheets

FUEL CELL DEVICE WITH A HEAT RELEASE MEANS DISPOSED ON AN AUTOMOBILE

BACKGROUND OF THE INVENTION

1. Field of the Invention

This invention relates to a fuel cell device and, more particularly, to a fuel cell device comprising a polymer electrolyte fuel cell in which an anode and a cathode are arranged at both sides of a polymer electrolyte membrane.

2. Description of the Prior Art

In general, a polymer electrolyte fuel cell in which an anode and a cathode are arranged at both sides of a proton-conductive polymer electrolyte membrane is known as a fuel cell. In the polymer electrolyte fuel cell, fuel gas including hydrogen is supplied to the anode and oxidation gas such as air is supplied to the cathode, whereby the electrochemical reaction is generated to shift proton in the polymer electrolyte membrane, to thereby produce electromotive force. This polymer electrolyte fuel cell is known as an energy-efficient fuel cell that can convert chemical energy of the fuel gas to electrical energy directly.

In this polymer electrolyte fuel cell, temperature of the polymer electrolyte membrane must be controlled to a predetermined temperature in order for the fuel cell to generate electric power in most safety and with high efficiency. Because of this, the typical polymer electrolyte fuel cell is so designed that a flow path of cooling water is formed in an interior of the fuel cell so that the cooling water can be circulated through the flow path to reduce heat generated when electric power is generated.

Cited as this typical fuel cell device are those disclosed, for example, in Japanese Laid-open Patent Publications No. Hei 6(1994)-188013 and No. Hei 10(1998)-340734 and shown in FIG. 7. In FIG. 7, there is shown a fuel cell device in which a fuel cell 1 and a radiator 2 are connected to each other through a closed line by cooling pipes 3. Provided between the cooling pipe 3 located upstream of the fuel cell 1 and the cooling pipe 3 located downstream of the radiator 2 is a pump 4 for feeding cooling water therebetween. In this fuel cell device, with the drive of the pump 4, the cooling water is sequentially circulated through between the fuel cell 1 and the radiator 2 to feed the cooling water cooled by the radiator 2 to the fuel cell 1, so as to cool the fuel cell 1. The cooling water warmed after having cooled the fuel cell 1 is flown back to the radiator 2, so as to be cooled down again by the radiator 2. A fan 5 is provided at a location facing the radiator 2 to cool the radiator 2 by it, so as to promote heat release of the radiator 2. A feed water tank 6 is connected to the radiator 2.

The fuel cell device shown in FIG. 7 is provided with the water feed pump 4 and the fan 5 for cooling the radiator 2, so a part of the electric power generated is consumed as the power for driving the pump 4 and fan 5. Thus, the fuel cell device of FIG. 7 suffers from the disadvantage of inevitable loss of a part of the electric power generated.

In addition, the provision of the pump 4 and the fan 5 provides a complicated structure of the device and an increased cost and also requires a space therefor, thus involving the disadvantage of upsizing of the device.

It is the object of the present invention to provide a fuel cell device that can well circulate cooling medium with simplified and compact construction, without any need of a driving device for feeding the cooling medium, to reduce electric power loss.

SUMMARY OF THE INVENTION

The present invention is directed to a novel fuel cell device comprising a fuel cell in which an anode and a cathode are arranged at both sides of a polymer electrolyte membrane; an inflow-side cooling pipe, connected to the fuel cell, for letting a cooling medium flow in the fuel cell; an outflow-side cooling pipe, connected to the fuel cell, for letting the cooling medium flow out from the fuel cell; and a heat release means to cool down the cooling medium, the inflow-side cooling pipe and the outflow-side cooling pipe being connected to the heat release means, wherein the heat release means is disposed at a position higher than the fuel cell and open to outside air.

With this configuration, heat generation involved in the electric power generation of the fuel cell raises the temperature of the cooling medium flowing out from the fuel cell and decreases the density. This causes the cooling medium to rise through the outflow-side cooling pipe and flow into the heat release means. Then, the heat release means heat-exchanges the cooling medium flown therein and the outside air, to cool down the cooling medium. The cooling medium as cooled down and thus increased in density lowers through the inflow-side cooling pipe and flows into the fuel cell again. With this flow, the cooling medium circulates through between the heat release means and the fuel cell and, as a result of this, the fuel cell is well cooled down by the cooling medium. Hence, there is no need to provide any additional driving device, such as a pump, for feeding cooling medium, so that a part of the electric power generated can be prevented from being consumed for driving such a driving device. Hence, the electric power loss can be reduced to achieve an effective supply of the electric power. Besides, complication of the structure of device and upsizing of the device that will be caused by the provision of some additional driving device can be avoided and accordingly reduction of cost and size resulting from the simplified structure of the device can be achieved.

In this configuration, it is preferable that the inflow-side cooling pipe is connected to the fuel cell at a position lower than a position at which the outflow-side cooling pipe is connected to the fuel cell.

With the structure in which the inflow-side cooling pipe is connected to the fuel cell at a position lower than a position at which the outflow-side cooling pipe is connected to the fuel cell, the cooling medium of increased density flown out of the heat release means can smoothly be fallen and fed into the fuel cell, while also the cooling medium of decreased density flown out of the fuel cell can smoothly be raised and fed into the heat release means. This can ensure further smooth circulation of the cooling medium through between the heat release means and the fuel cell to yield further improved cooling efficiency.

The fuel cell device of the present invention is preferably loaded in an automobile. In this embodiment in which the fuel cell device is loaded in the automobile, for example when the automobile increases in speed, on the one hand, the fuel cell generates more electric power, so that heat generation involved in the power generation raises the temperature of the cooling medium flown out of the fuel cell; on the other hand, the heat release means gets higher winds in itself to the extent corresponding to the increased speed, so that the cooling medium flowing into the heat release means is cooled down with further efficiency to the extent corresponding to the raised temperature. When the automobile is in idle engine operation, on the one hand, the heat release means gets no winds in itself, so that the cooling medium
} flown in the heat release means is not cooled down with efficiency; on the other hand, little heat is generated from the power generation of the fuel cell, so that the cooling medium flowing out of the fuel cell does not rise to a high temperature and thus no inconvenience is caused. Thus, cooling efficiencies of the heat release means can be varied in accordance with temperature of the cooling medium that varies in accordance with the electric power generated by the fuel cell, without any particular device therefor. Hence, the efficient cooling of the fuel cell can be achieved with simple constitution.

In this embodiment, it is preferable that an air spoiler having a wing portion extending in a widthwise direction of the automobile and legs supporting the wing portion is mounted on the automobile, and the heat release means is disposed in a place under the wing portion.

With the configuration in which the air spoiler is mounted on the automobile and also the heat release means is disposed in a place under the wing portion of the air spoiler, the air spoiler produces downforce so that increased stability of the automobile can be produced when travelling at high speeds. In addition, the air spoiler acts to collect the winds and feed them to the heat release means, so that further improved cooling efficiency of the heat release means can be produced. As a result of this, the heat release means of compact design can be provided and also improved design can be provided by integral combination of this heat release means with the air spoiler.

Further, when the heat release means is disposed under the air spoiler, it is preferable that the heat release means is disposed under the wing portion on a rear side thereof with respect to a longitudinal direction of the automobile.

With the configuration, the heat release means disposed under the wing portion on the rear side thereof with respect to a longitudinal direction of the automobile can let more winds in, as compared with the heat release means disposed under the wing portion on a front side thereof, to produce a further improved cooling efficiency.

DETAILED DESCRIPTION OF THE PREFERRED EMBODIMENTS

The present invention will be described in detail by way of an illustrative embodiment with reference to the accompanying drawing FIGS. 1–7.

Figure 1:
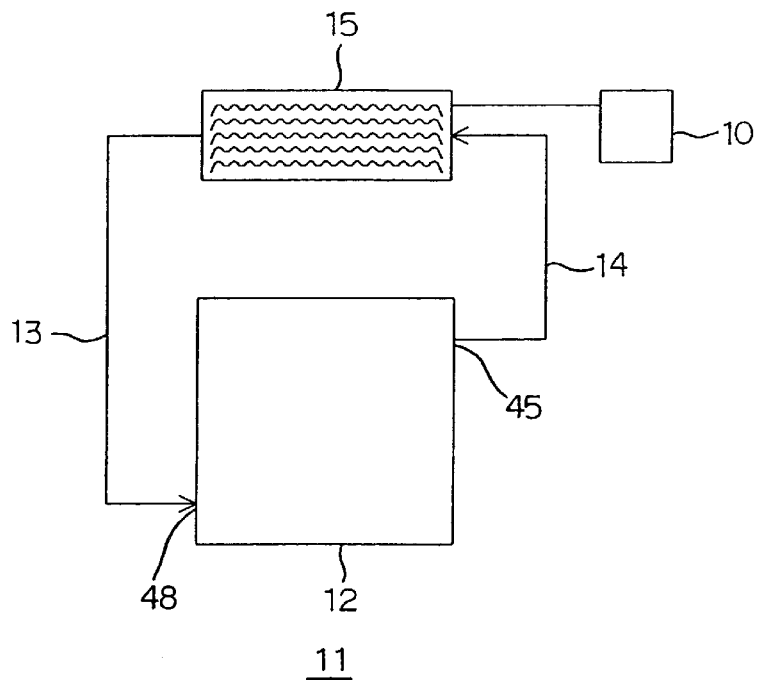
FIG. 1 is a schematic block diagram giving a diagrammatic sketch of a construction of a fuel cell device in the form of one preferred embodiment of the present invention.

Referring to FIG. 1, which shows a schematic block diagram giving a diagrammatic sketch of a construction of a fuel cell device in the form of one preferred embodiment of the present invention, the fuel cell device 11 is provided with a fuel cell 12, an inflow-side cooling pipe 13 through which cooling water used as cooling medium is flown into the fuel cell 12, an outflow-side cooling pipe 14 through which the cooling water is flown out from the fuel cell 12, and a radiator 15 used as a heat release means for cooling down the cooling water. An outflow side of the fuel cell 12 and an inflow side of the radiator 15 are connected to each other through the outflow-side cooling pipe 14. An outflow side of the radiator 15 and an inflow side of the fuel cell 12 are connected to each other through the inflow-side cooling pipe 13. Thus, the fuel cell device is so designed that the fuel cell 12 and the radiator 15 are connected through a closed line via the inflow-side cooling pipe 13 and the outflow-side cooling pipe 14.

A water tank 10 for feeding water is connected to the radiator 15. In FIG. 1, only the parts or elements corresponding in structure to cooling water supply/discharge portions of the fuel cell device 11 are shown, and the other parts or elements corresponding in structure to e.g. fuel gas supply/discharge portions and oxidation gas supply/discharge portions are omitted.

Figure 2:
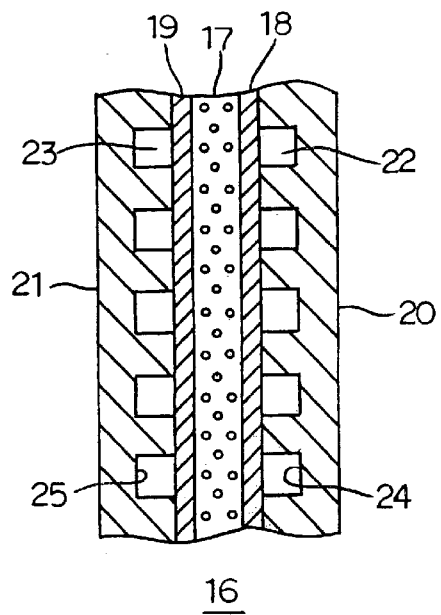
FIG. 2 is a schematic block diagram giving a diagrammatic sketch of a construction of a unit cell of a fuel cell.

The fuel cell 12 is a polymer electrolyte fuel cell having a stack structure in which a plurality of unit cells 16, each forming a constitutional unit, are stacked. As shown in FIG. 2, each unit cell 16 is composed of a proton-conductive polymer electrolyte membrane 17; an anode 18 and a cathode 19 formed in the form of porous electrodes by which noble metals are supported; and separators 20, 21 formed in the form of conductive members of gas impermeability.

To be more specific, used as the proton-conductive polymer electrolyte membrane 17 is a perfluorosulfonic acid type membrane that can generate electric power in most safety and with highest efficiency when it is controlled to nearly about 80° C. The anode 18 and the cathode 19 are arranged in such a manner as to sandwich the polymer electrolyte membrane 17 therebetween. Further, the separators 20, 21 are arranged in such a manner as to sandwich the anode 18 and the cathode 19 therebetween. The separator 20 has fuel gas flow channels 24 formed therein so that fuel gas flow paths 22 to feed the fuel gas including hydrogen can be defined between the separator 20 and the anode 18. The separator 21 has oxidation gas flow channels 25 formed therein so that oxidation gas flow paths 23 to feed the oxidation gas including oxygen can be defined between the separator 21 and the cathode 19. The fuel gas is fed from a fuel gas supply/discharge portion (not shown) to the fuel gas flow paths 22. The oxidation gas is fed from an oxidation gas supply/discharge portion (not shown) to the oxidation gas flow paths 23.

In the anode 18, the hydrogen in the fuel gas produces proton and electron by the reaction given below:

Then, the proton produced moves through the polymer electrolyte membrane 17 toward the cathode 19, while the electron produced runs out to an external circuit (not shown). On the other hand, in the cathode 19, the oxygen in the oxidation gas undergoes the following reactions with the proton that moved in through the polymer electrolyte membrane 17 and the electron that runs in from the external circuit, to thereby produce water. As a result of this, the electromotive force is produced.

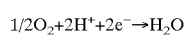

It is to be noted that FIG. 2 illustrates that the fuel gas flow channels 24 and the oxidation gas flow channels 25 are formed, respectively, on only a single side of their respective separators 20, 21 but, actually, the fuel gas flow channels 24 and the oxidation gas flow channels 25 are formed, respectively, on each side of their respective separators 20, 21, as mentioned below. The fuel gas flow paths 22 are defined between one surface of the separator 20, 21 and the anode 18, and the oxidation gas flow paths 23 are defined between the other surface of the separator 20, 21 and the cathode 19 of the adjoining unit cell 16. Thus, the fuel gas flow paths 22 and the oxidation gas flow paths 23 are defined between the separator 20, 21 and the anode 18 and the between the separator 20, 21 and the cathode 19, respectively. Also, the flow of fuel gas and the flow of oxidation gas are separately defined between the separator 20 and the adjoining unit cell 16 and between the separator 21 and the adjoining unit cell 16, respectively. For forming the stack structure by stacking the unit cells 16, two separators 20, 21 located at the opposite ends of the stack structure are required to have the fuel gas flow channels 24 and the oxidation gas flow channels 25 formed respectively in only their respective surfaces facing the anode 18 and the cathode 19.

Figure 3:
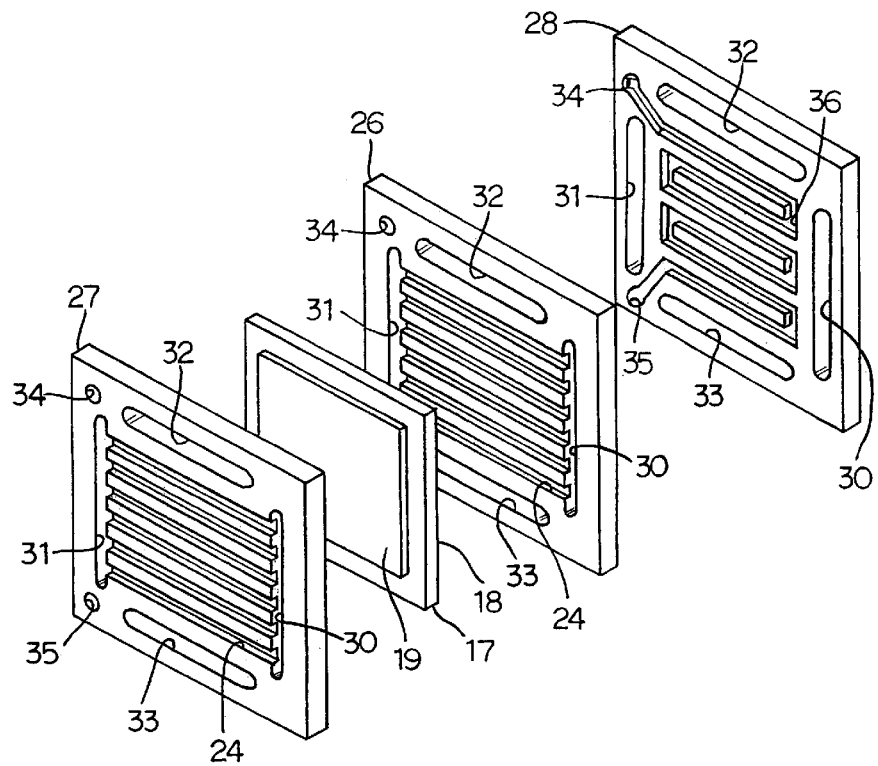
FIG. 3 is an exploded perspective view showing the unit cells that are to be stacked to each other.

Referring now to FIG. 3, there is shown in an exploded perspective view the state of the unit cells 16 to be stacked as a practical manner. The separators 20, 21 shown in FIG. 2 are presented in the form of any of an end separator 26, a central separator 27 and a cooling separator 28 in FIG. 3.

The end separator 26, the central separator 27 and the cooling separator 28 each have cooling water holes 34, 35 of a circular form in section which are formed at upper and lower corners in one end side thereof. When the unit cells 16 are stacked, the cooling water holes 34, 35 form the cooling water flow paths extending through the unit cells in the stacking direction. The end separator 26, the central separator 27 and the cooling separator 28 each have, on opposite end portions thereof, a pair of spaced apart fuel gas slots 30, 31 and a pair of spaced apart oxidation gas slots 32, 33 which are formed in their respective stacked surfaces to extend along their respective sides. When the unit cells 16 are stacked, the fuel gas slots 30, 31 form the fuel gas flow paths extending through the unit cells in the stacking direction and the oxidation gas slots 32, 33 form the oxidation gas flow paths extending through the unit cells in the stacking direction.

The end separator 26 has, in one surface thereof, the plurality of fuel gas flow channels 24 arranged in parallel and connecting between the confronting fuel gas slots 30 and 31. The fuel gas flow channels 24 define the fuel gas flow paths 22 between the fuel gas flow channels 24 and the adjoining anode 18 when the unit cells 16 are stacked. The end separator 26 has a flat surface with no channels in the other surface thereof (not shown in FIG. 3).

The central separator 27 has in one surface thereof the plurality of fuel gas flow channels 24 arranged in parallel and connecting between the confronting fuel gas slots 30 and 31, as is the case with the end separator 26. The fuel gas flow channels 24 define the fuel gas flow paths 22 between the fuel gas flow channels 24 and the adjoining anode 18 when the unit cells 16 are stacked. The central separator 27 has, in the other surface thereof (not shown in FIG. 3), the plurality of oxidation gas flow channels 25 arranged in parallel and connecting between the confronting oxidation gas slots 32 and 33. The oxidation gas flow channels 25 define the oxidation gas flow paths 23 between the oxidation gas flow channels 25 and the adjoining cathode 19 when the unit cells 16 are stacked.

The cooling separator 28 has, in one surface thereof, a cooling water flow channel 36 having the form of a zigzag and connecting between the cooling water holes 34 and 35. When the unit cells 16 are stacked, the cooling water flow channel 36 adjoins the end separator 26 and defines the cooling water path between the cooling water flow channel 36 and a flat surface with no channels of the end separator 26. The cooling separator 28 has, in the other surface thereof (not shown in FIG. 3), the plurality of oxidation gas flow channels 25 arranged in parallel and connecting between the confronting oxidation gas slots 32 and 33. The oxidation gas flow channels 25 define the oxidation gas flow paths 23 between the oxidation gas flow channels 25 and the adjoining cathode 19 when the unit cells 16 are stacked.

The end separator 26, the central separator 27 and the cooling separator 28 are stacked through the intermediary of the polymer electrolyte membrane 17 sandwiched between the anode 18 and the cathode 19 which are provided in sandwich relation between the end separator 26 and the central separator 27, to thereby produce the stack structure.

It is to be noted that FIG. 3 illustrates only one each of the end separator 26, the central separator 27 and the cooling separator 28 but, actually, a predetermined number of central separators 27 are stacked in series through the polymer electrolyte membranes 17 sandwiched between their respective anodes 18 and cathodes 19. The number of end separator 26, central separator 27 and cooling separator 28 to be stacked can properly be determined in accordance with conditions, such as calorific values of the unit cells 16 to be expected from the size of load connected to the fuel cell 12, temperature of the cooling water supplied to the fuel cell 12 and a flow rate of the cooling water supplied to the fuel cell 12. For example, each time five central separators 27 are stacked in series, the end separator 26 and the cooling separator 28 are stacked thereto and, with these made a set, several sets of separators are stacked in sequence, to thereby produce the stack structure.

If the end separator 26, the central separators 27 and the cooling separator 28 are stacked in sequence, then an end separator facing in opposite direction to the end separator 26 is disposed at the end corresponding to the near side of FIG. 3, though not shown in FIG. 3. That end separator has the structure opposite to the end separator 26 shown in FIG. 3. Specifically, its flat surface with no channels faces outside when stacked and its inner surface forms therein the plurality of oxidation gas flow channels 25 arranged in parallel and connecting between the confronting oxidation gas slots 32 and 33. The oxidation gas flow channels 25 define the oxidation gas flow paths 23 between the oxidation gas flow channels 25 and the adjoining cathode 19 when the unit cells 16 are stacked.

Further, current collecting plates 37, 38, insulating plates 39, 40 and end plates 41, 42 are arranged one at each end of the stack structure thus formed by a predetermined number of end separators 26, central separators 27 and cooling separators 28 being stacked through the intermediary of polymer electrolyte membranes 17 sandwiched between their respective anodes 18 and cathodes 19, whereby the fuel cell 12 having the stack structure is formed.

Figure 4:
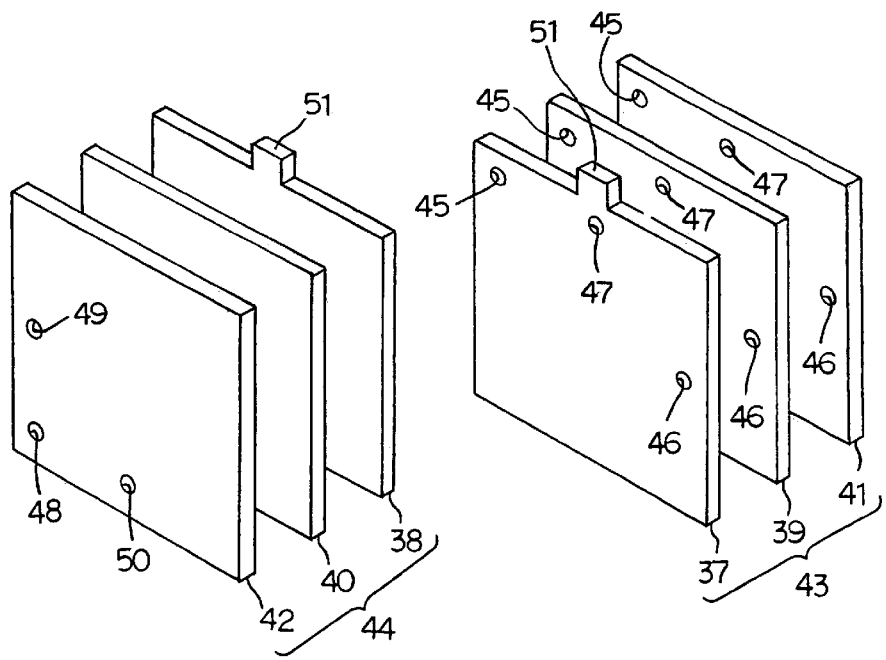
FIG. 4 is an exploded perspective view showing an end of the fuel cell on the feeding side and an end of the same on the discharge side.

Referring now to FIG. 4, there is shown, in an exploded perspective view, the arrangements of the current collecting plates 37, 38, the insulating plates 39, 40 and the end plates 41, 42. The current collecting plate 37, the insulating plate 39 and the end plate 41 are stacked in sequence toward the outside of the arrangement at one side end thereof at which the end separator 26 of the stack structure is disposed. These members 37, 39, 41 form a discharge side end portion 43 of the fuel cell 12. The current collecting plate 38, the insulating plate 40 and the end plate 42 are stacked in sequence toward the outside of the arrangement at the other side end thereof corresponding to the near side of the stuck structure of FIG. 3 at which the end separator facing in opposite direction to the end separator 26 is disposed. These members 38, 40, 42 form a supply side end portion 44 of the fuel cell 12.

The current collecting plate 37, the insulating plate 39 and the end plate 41, which form the discharge side end portion 43, each have a drain hole 45, a fuel gas discharge hole 46 and an oxidation gas discharge hole 47 which are formed in the positions corresponding to the upper cooling water hole 34, the fuel gas slot 30 and the oxidation gas slot 32. The current collecting plate 38, the insulating plate 40 and the end plate 42, which form the supply side end portion 44, each have a water supply hole 48, a fuel gas supply hole 49 and an oxidation gas supply hole 50 which are formed in the positions corresponding to the lower cooling water hole 35, the fuel gas slot 31 and the oxidation gas slot 33.

The current collecting plates 37, 38 are formed of conductive material such as copper and have terminal posts 51 integrally formed therewith at top portions thereof The electromotive force from the fuel cell 12 is taken out via the terminal posts 51. The insulating plates 39, 40 are formed of insulating material such as rubber and resin to insulate the stack structure of the unit cells 16 stacked from a casing (not shown) receiving the stack structure therein and from the end plates 41, 42. The end plates 41, 42 are formed of high rigid material such as steel.

The fuel cell 12 having the stack structure formed by the unit cells 16 being stacked in the way mentioned above is housed in a casing (not shown) and is held therein in the state in which a predetermined pressure is applied across the members in the stacking direction. The fuel gas from the fuel gas supply/discharge portion (not shown) is supplied to the fuel gas supply hole 49. The oxidation gas from the oxidation gas supply/discharge portion (not shown) is supplied to the oxidation gas supply hole 50. The fuel gas is supplied from the fuel gas supply holes 49 to the interior of the fuel cell 12 of the stack structure. After passing through the fuel gas slots 31, the fuel gas flow paths 22 and the fuel gas slots 30 in sequence, the fuel gas is discharged from the fuel gas discharge holes 46. The oxidation gas is supplied from the oxidation gas supply holes 50 to the interior of the fuel cell 12 of the stack structure. After passing through the oxidation gas slots 33, the oxidation gas flow paths 23 and the oxidation gas slots 32 in sequence, the oxidation gas is discharged from the oxidation gas discharge holes 47.

As shown in FIG. 1 as well, the inflow-side cooling pipe 13 is connected to the water supply holes 48 formed in a place lower than the drain holes 45 in the supply side end portion 44 of the fuel cell 12. Also, the outflow-side cooling pipe 14 is connected to the drain holes 45 formed in a place higher than the water supply holes 48 in the discharge side end portion 43 of the fuel cell 12. Thus, the fuel cell 12 and the radiator 15 are interconnected through the closed line via the inflow-side cooling pipe 13 and the outflow-side cooling pipe 14, as aforementioned, so that the cooling water can circulate through between the fuel cell 12 and the radiator 15. With this configuration, the cooling water is supplied from the water supply holes 48 to the interior of the fuel cell 12 of the stack structure, as shown in FIGS. 3 and 4. After passing through the cooling water holes 34, the cooling water paths and the cooling water holes 35 in sequence, the cooling water is discharged from the drain holes 45.

As shown in FIG. 1, in this fuel cell device 11, the inflow-side cooling pipe 13 and the outflow-side cooling pipe 14 are disposed vertically. Also, the radiator 15 is spaced apart from the fuel cell 12 and is located in a position higher than the fuel cell and open to the outside air. The position open to the outside air may be any position in an environment in which the radiator 15 can contact with the outside air so that the cooling water flowing in the radiator 15 can be cooled down via heat exchange.

With this configuration, while electric power is generated by the fuel cell 12, heat generation involved in the electric power generation of the fuel cell 12 raises the temperature of the cooling water flowing out of the interior of the fuel cell 12 and decreases the density. This causes the cooling water to rise through the outflow-side cooling pipe 13 and flow into the radiator 15. Then, the radiator 15 heat-exchanges the cooling water flown therein and the outside air, to cool down the cooling water. The cooling water as cooled down and thus increased in density lowers through the inflow-side cooling pipe 13 and flows into the fuel cell 12 again. With this flow, the cooling water circulates through between the radiator 15 and the fuel cell 12 and, as a result of this, the fuel cell 12 is well cooled down by the cooling water.

Thus, with this arrangement in which the radiator 15 is located in a place higher than the fuel cell 12 and open to the outside air, the cooling water can be allowed to circulate through between the radiator 15 and the fuel cell 12, while it can be cooled down by the radiator 15 with a simple structure. Hence, there is no need to provide any additional driving device, such as a pump for feeding cooling water, so that a part of the electric power generated by the fuel cell 12 can be prevented from being consumed for driving such a driving device. Hence, the electric power loss can be reduced to achieve an effective supply of the electric power. Besides, complication of the structure of device and upsizing of the device that will be caused by the provision of additional driving devices can be avoided and accordingly reduction of cost and size resulting from the simplified structure of the device can be achieved.

Also, this fuel cell device 11 is so structured that the water supply holes 48 of the supply side end portion 44 to which the inflow-side cooling pipe 13 is connected are located in a position lower than the drain holes 45 of the discharge side end portion 43 to which the outflow-side cooling pipe 14 is connected. With this structure, the cooling water of increased density flown out of the radiator 15 can smoothly be fallen and fed into the water supply holes 48, while also the cooling water of decreased density flown out of the drain holes 45 can smoothly be raised and fed into the radiator 15. This can ensure further smooth circulation of the cooling water through between the radiator 15 and the fuel cell 12 to yield further improved cooling efficiency.

The fuel cell device 11 of this embodiment is preferably loaded in an electric automobile so that the electric power can be supplied to a vehicle driving motor.

Figure 5:
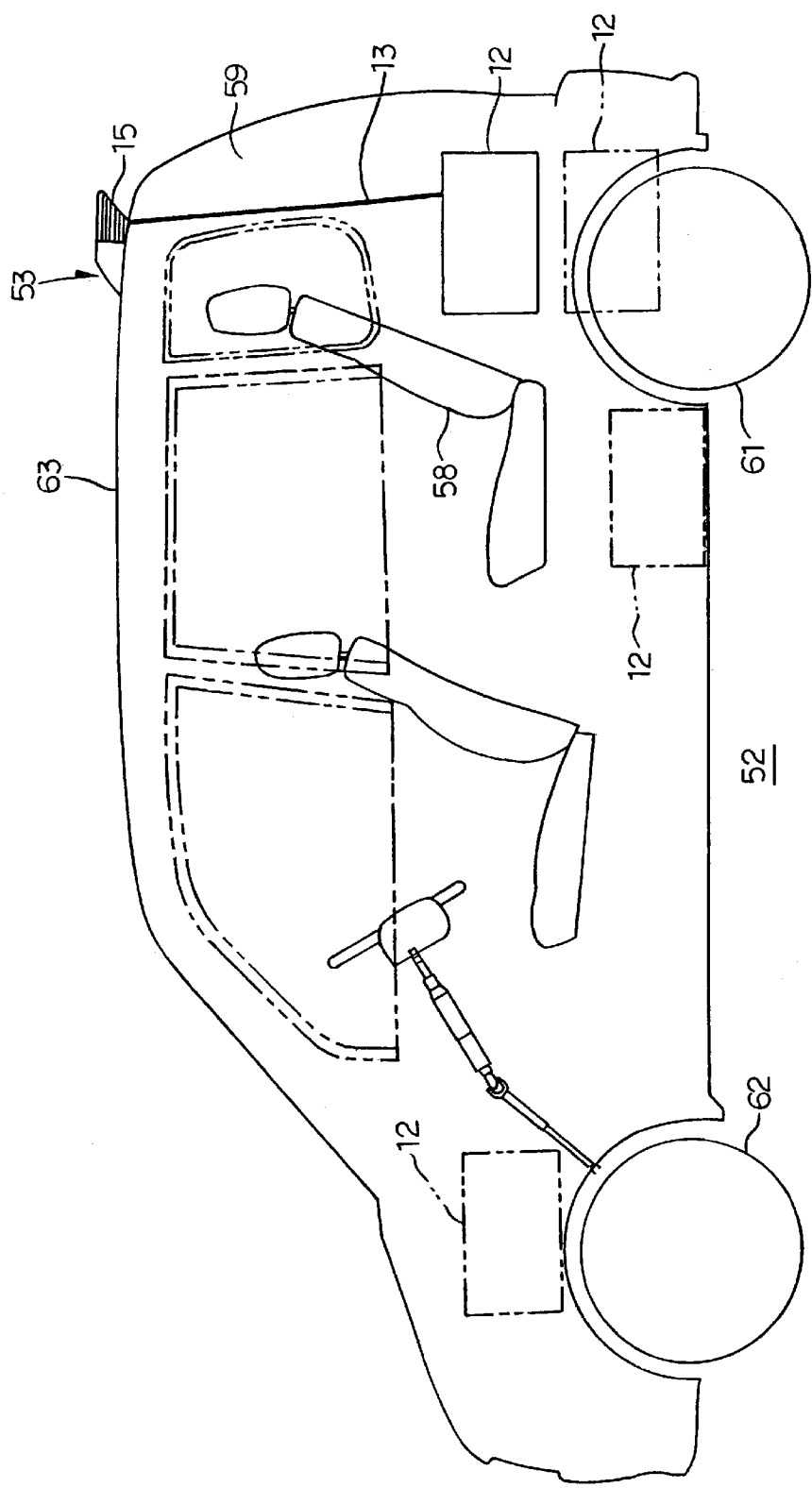
FIG. 5 is a side view of a principal part of an electric automobile loaded with a fuel cell device shown in FIG. 1.
Figure 6:
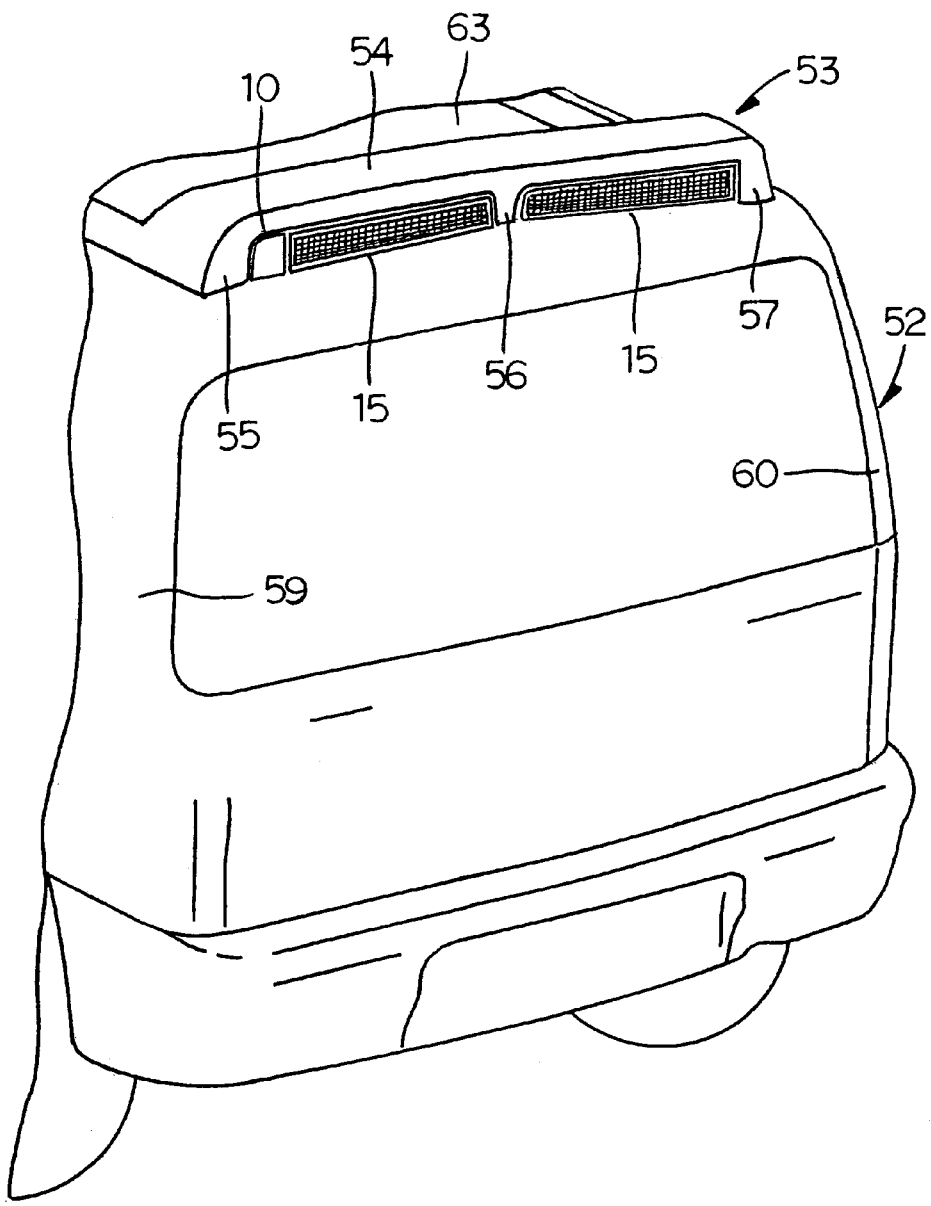
FIG. 6 is a rear view of a principal part of the electric automobile shown in FIG. 5.
Figure 7:
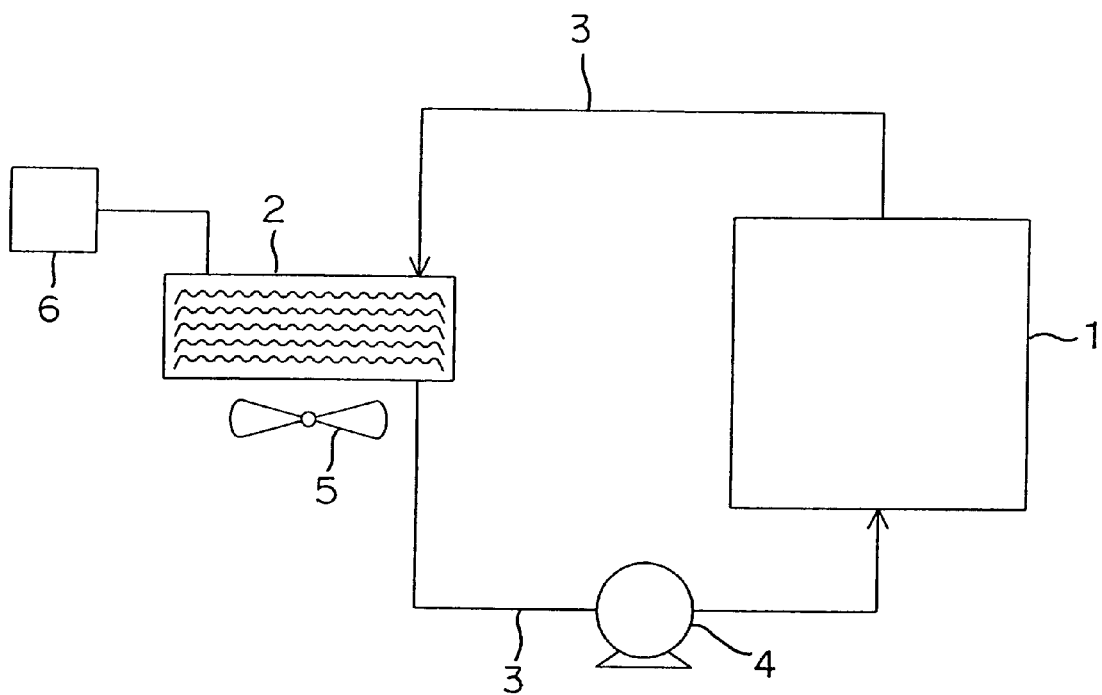
FIG. 7 is a schematic block diagram showing a conventional type of fuel cell device.

Referring to FIG. 5, there is shown a side view of a principal part of an example in which the fuel cell device 11 of this embodiment is loaded in an electric automobile of a station wagon type. FIG. 6 is a rear view of a principal part of the electric automobile shown in FIG. 5. In FIGS. 5 and 6, an air spoiler 53 is mounted on a roof panel 63 of the electric automobile 52 at a rear side thereof with respect to a longitudinal direction of the automobile. As shown in FIG. 6, the air spoiler 53 is provided with a plurality of legs 55, 56 and 57 vertically extending from both widthwise ends thereof and from a widthwise center portion thereof, respectively, and a wing portion 54 supported by the legs 55, 56 and 57 with spaced apart from the roof panel 63. The wing portion 54 has a form stretching generally the length in the widthwise direction of the automobile and is integrally formed with the legs 55, 56 and 57.

In this electric automobile 52, the fuel cell 12 is disposed at a rear side of rear seats 58 and over a rear wheel 61. The radiator 15 and a water tank 10 are disposed in spaces between the roof panel 63 and the wing portion 54. The radiator 15 and the fuel cell 12 are connected through the closed line via the inflow-side cooling pipe 13 and the outflow-side cooling pipe 14 which are inserted respectively in cylindrical rear pillars 59, 60 formed to have a closed section.

To be more specific, as shown in FIG. 6, the space between the roof panel 63 and the wing portion 54 is partitioned into two spaces by the legs 55 and 57 provided at both widthwise end portions and the leg 56 provided at the center portion with respect to the widthwise direction of the automobile. The water tank 10 is disposed at an end of either of the two spaces, and two radiators 15 are disposed in the two spaces, respectively. Specifically, the water tank 10 and one of the radiators 15 are disposed in the space defined by the legs 55 and 56 provided at one side end of and at the center portion of the wing portion with respect to the widthwise direction of the automobile, respectively. In other words, the water tank 10 is so disposed as to cover vertical dimensions of the space at an outer end with respect to the widthwise direction of the automobile. The one radiator 15 is disposed adjacent to the water tank 10 so as to cover vertical dimensions and entire horizontal dimensions of the space at an inner end with respect to the widthwise direction of the automobile. In the space defined by the legs 57 and 56 provided at the other side end of and at the center portion of the wing portion with respect to the widthwise direction of the automobile, respectively, the other radiator 15 is so disposed as to cover vertical dimensions and entire horizontal dimensions of the space with respect to the widthwise direction of the automobile.

The outflow-side cooling pipe 14 connected to the discharge side end portion 43 of the fuel cell 12 is connected to the one radiator 15 through the interior of the rear pillar 59. The inflow-side cooling pipe 13 connected to the supply side end portion 44 of the fuel cell 12 is connected to the other radiator 15 through the interior of the rear pillar 60. These two radiators 15 are connected to each other through a connecting pipe (not shown) inserted in the center leg 56. The one radiator 15 is connected to the water tank 10 through a connecting pipe (not shown). The two radiators 15 and the water tank 10 may be integrated with each other.

Also, the two radiators 15 are formed of a lightweight aluminum and are fixed on the roof panel 63 with screws and the like. The water tank 10 is also fixed on the roof panel 63 with screws and the like.

In the embodiment wherein the electric automobile 52 is loaded with the fuel cell device 11 of this embodiment of the present invention, for example when the electric automobile 52 increases in speed, on the one hand, the fuel cell 12 generates more electric power, so that heat generation involved in the power generation raises the temperature of the cooling water flown out of the fuel cell 12; on the other hand, the radiators 15 get higher winds in themselves to the extent corresponding to the increased speed, so that the cooling water flowing into the radiators 15 is cooled down with further efficiency to the extent corresponding to the raised temperature. When the electric automobile 52 is in idle engine operation, on the one hand, the radiators 15 get no winds in themselves, so that the cooling water flowing in the radiators 15 is not cooled down with efficiency; on the other hand, no heat is generated from the power generation of the fuel cell 12, so that the cooling water flowing out of the fuel cell 12 does not rise to a high temperature and thus no inconvenience is caused. Thus, cooling efficiencies of the radiators 15 can be varied in accordance with temperature of the cooling water that varies in accordance with the electric power generated by the fuel cell 12, without any particular device therefor. Hence, the efficient cooling of the fuel cell can be achieved with simple and low-cost constitution.

The air spoiler 53 is disposed to produce downforce to press down the electric automobile 52 toward the ground so as to produce increased stability of the automobile when travelling at high speeds. Since the air spoiler 53 acts to collect the winds and allow them to blow through the space between the roof panel 63 and the wing portion 54 of the spoiler 53, the radiators 15 disposed in that location (i.e., the location for the air spoiler 53 to be mounted) can provide improved cooling efficiency. Thus, even when the radiators 15 of compact design are arranged in a limited space between the roof panel 63 and the wing portion 54, the cooling water can be cooled down with efficiency. Further, since the radiators 15 are exteriorly covered by the wing portion 54 of the spoiler 53 and the legs 55 and 57 of the same provided at both ends with respect to the widthwise direction of the automobile, improved design can be presented.

To be more specific, as shown in FIG. 5, the two radiators 15 are disposed under the wing portion 54 on a rear side thereof with respect to the longitudinal direction of the automobile. The radiators 15 disposed under the wing portion 54 on the rear side thereof can let more winds in, as compared with the radiators disposed under the wing portion 54 on a front side thereof, to produce a further improved cooling efficiency.

No particular limitation is imposed on the location of the fuel cell 12, as long as it is disposed in a location below the radiators 15. For example, as indicated by a phantom line in FIG. 5, the fuel cell 12 may be disposed in a location between rear wheels 61, in a location on the front side thereof, or in a location over front wheels 62. Also, the radiators 15 are not necessarily disposed under the wing portion 54 of the air spoiler 53 but may be disposed at any location on the roof panel 63 or may be disposed in a proper location other than the roof panel 63, depending on the position of the fuel cell 12. Further, a blower such as a fan may properly be disposed in a location facing the radiators 15 in accordance with required electricity generated or required cooling efficiency, to improve the cooling efficiency. In this variant, although a part of electric power is consumed to drive the fan, the fan consumes a far smaller electric power, as compared with the other driving device such as a pump, so it has little influence on the electric power loss.

While the fuel cell device 11 of one embodiment of the invention loaded in the electric automobile 52 is taken as an example in the above description, it may be loaded in other vehicles including boats and ships and aircraft.

While the cooling water is used as the cooling medium in the illustrated embodiment, any known refrigerant other than that may be used. Further, while the radiators 15 are used as the heat release means, any known cooling device for transferring heat from the cooling medium to outside air may be used.

While the illustrative embodiments of the present invention are provided in the above description, such is for illustrative purpose only and it is not to be construed restrictively. Modification and variation of the present invention that will be obvious to those skilled in the art is to be covered by the following claims.

What is claimed is:

1. A fuel cell system for an automobile, comprising:
   a fuel cell in which an anode and a cathode are arranged at both sides of a polymer electrolyte membrane;
   an inflow-side cooling pipe, connected to said fuel cell, for letting a cooling medium flow in said fuel cell;
   an outflow-side cooling pipe, connected to said fuel cell, for letting said cooling medium flow out of said fuel cell;
   a heat release means to cool down said cooling medium, said inflow-side cooling pipe and said outflow-side cooling pipe being connected to said heat release means,
   wherein said heat release means is disposed at a position higher than said fuel cell and open to outside air;
   wherein an air spoiler having a wing portion extending in a widthwise direction of said automobile and legs supporting said wing portion is mounted on said automobile; and wherein said heat release means is disposed in a place under said wing portion.

2. The fuel cell system according to claim 1, wherein said heat release means is disposed under said wing portion on a rear side thereof with respect to a longitudinal direction of said automobile.

3. The fuel cell system according to claim 1, wherein said inflow-side cooling pipe is connected to said fuel cell at a position lower than a position at which said outflow-side cooling pipe is connected to said fuel cell.

* * * * *